United States Patent [19]

Truax et al.

[11] Patent Number: 5,174,327
[45] Date of Patent: Dec. 29, 1992

[54] IN-LINE CHECK VALVE

[75] Inventors: Perin E. Truax, Caledonia; Eldon D. Jackson, Hastings, both of Mich.

[73] Assignee: The Viking Corporation, Hastings, Mich.

[21] Appl. No.: 828,366

[22] Filed: Jan. 30, 1992

[51] Int. Cl.⁵ .............................. F16K 15/02
[52] U.S. Cl. .................. 137/469; 137/515.3; 137/536; 137/540
[58] Field of Search .......... 137/469, 515.3, 536, 137/540

[56] References Cited

U.S. PATENT DOCUMENTS

| | | | |
|---|---|---|---|
| 2,601,563 | 6/1952 | Selwyn | 137/540 |
| 2,755,816 | 7/1956 | Collins | |
| 2,930,401 | 3/1960 | Cowan | 137/540 |
| 2,931,385 | 4/1960 | Carlisle | 137/540 X |
| 2,959,188 | 11/1960 | Kepner | 137/540 |
| 3,099,999 | 8/1963 | Vismara | |
| 3,149,643 | 9/1964 | Breitsprecher | 137/469 |
| 3,548,868 | 12/1970 | Mullaney, III | 137/515.5 |

*Primary Examiner*—Robert G. Nilson
*Attorney, Agent, or Firm*—Price, Heneveld, Cooper, DeWitt & Litton

[57] ABSTRACT

An in-line check valve includes a housing defining a cavity with an inlet and an outlet, a removable seat attachable to the inlet, a piston movably positioned in the housing and including a seal that operably engages the seat, and a spring positioned around the piston for biasing the piston into engagement with the seat. The piston defines a surface impinged on by fluid flowing therethrough so that the differential pressure across the valve in a given flow range is less than the opening pressure. The housing defines a plurality of lugs which retain the piston within the housing and permit servicing of the seal.

14 Claims, 3 Drawing Sheets

IN-LINE CHECK VALVE

BACKGROUND OF THE INVENTION

The present invention relates to check valves and, more particularly, to in-line check valves for use in fire protection systems A typical fire protection system includes a riser or supply pipe connected to a water main. Branches are connected to the riser and extend throughout the building to the areas to be protected. Drop pipes are secured to the branches. Each drop pipe supports an automatic sprinkler head. Each sprinkler head opens or releases when a predetermined temperature is reached, which indicates a fire condition. Upon opening, water or other fire suppression fluid flows to the sprinkler heads and to the area of fire. The systems also include check valves in the supply piping. The check valves, which permit flow in one direction, generally include a seat and a check valve element held against the seat by a spring. A predetermined pressure differential across the valve is necessary to permit flow through the valve. The flow loss or pressure drop across the valves should be taken into consideration when designing the system to insure a proper supply of fluid to the sprinkler heads. Booster pumps may be included to insure an adequate supply to the sprinkler system.

In addition, existing check valves present difficulties with field maintenance and installation. Certain types of existing check valves may be subject to fouling from debris in the water or supply line. The debris may prevent a check valve from fully opening or closing.

A need exists for a check valve having a reduced flow loss or pressure drop resulting in increased flow and which includes a large flow area to prevent fouling. In addition, a need exists for a check valve which significantly eases installation and field maintenance.

SUMMARY OF THE INVENTION

In accordance with the present invention, the aforementioned needs are substantially fulfilled. Essentially, a check valve subassembly is provided which includes a valve housing or body defining a valve cavity, an inlet end and an outlet end. A valve seat is removably secured to the valve body at the inlet end. A valve piston is movably disposed within the valve cavity. The piston defines a through bore having an inlet and a outlet. The valve body further includes a plurality of arms joining a centrally positioned seal support. A deflector or cone retains a resilient seal on the seal support. A spring resiliently biases the piston and the seal toward and into engagement with the valve seat. The piston body further defines a deflecting or impingement surface at its inlet end. After initial opening of the valve, fluid flowing through the valve body impinges on the impingement surface generating a force which tends to open the valve against the closing force or resilient bias of the spring. Provision is made for retaining the piston within the valve body upon removal of the cover so that the valve seal may be replaced.

The configuration of the valve piston results in a differential pressure or pressure drop across the check valve within a particular flow range which is less than the initial cracking differential pressure. The geometry of the valve piston provides a relatively large flow area, which reduces or prevents fouling of the valve inlet and outlet due to debris in the supply line. The reduced differential pressure across the valve within a desired flow range permits the specification of a smaller valve for a given system and allows for a lower supply pressure while still achieving a desired or predetermined flow rate or fluid supply to sprinkler heads or the like. The valve may permit down-sizing of a booster pump in a fire protection system or elimination of such pumps. The valve assembly may be easily installed into a main valve housing in the supply system in a cartridge-like fashion. The valve is easily removed and the seal easily serviced without removal of the piston from the valve body or housing.

DETAILED DESCRIPTION OF THE PREFERRED EMBODIMENT

Figure 1:
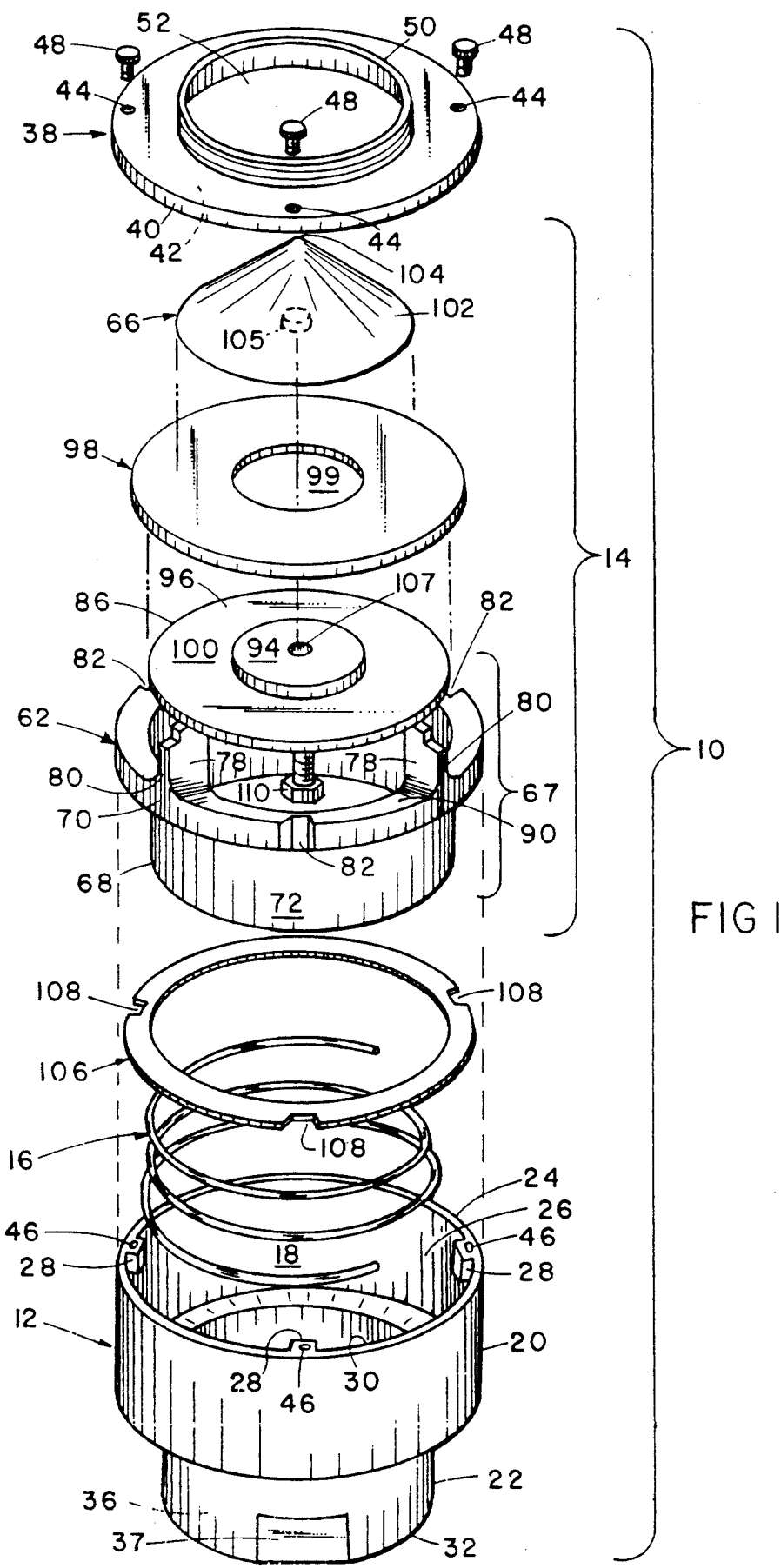
FIG. 1 is an exploded perspective view of an in-line valve embodying the present invention.
Figure 2:
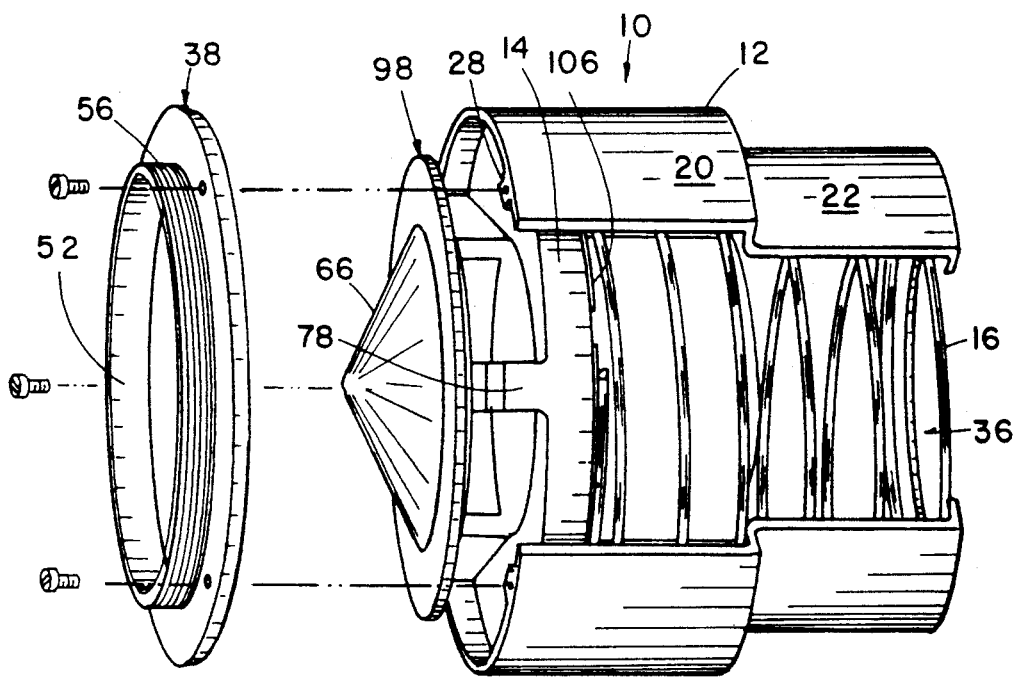
FIG. 2 is a perspective view of a partially assembled valve with the valve housing partially broken-away.

An in-line check valve assembly embodying the present invention is illustrated in FIGS. 1-4 and generally designated by the numeral 10. Check valve assembly 10 includes a valve body or housing 12, an internal piston 14 adapted to seat against one end of housing 12, and a spring 16 adapted to bias piston 14 toward the one end of housing 12. The valve is adapted for use in relatively high volume water supply lines for fire protection systems and the like. The geometry of valve assembly 10 allows a lower pressure drop or flow loss across the valve, between about 10 gpm and 500 gpm, than the initial cracking pressure of the valve. The assembly reduces costs associated with fire protection systems. Due to the lower flow loss, a smaller valve may be specified resulting in cost savings. The lower flow loss characteristics permit a lower supply line pressure. A smaller booster pump may be specified or, in certain applications, the pump may be eliminated. The valve has a large flow area which prevents fouling. As explained below, the valve eases installation and field maintenance.

Housing 12 (FIG. 1) is a cylindrical shell that defines a stepped bore or an internal cavity 18 with an enlarged end portion 20 and a reduced end portion 22. Enlarged end portion 20 has an inlet end 24 and a wall section with an inner smooth surface 26 on its inner diameter adapted to guide piston 14 between closed and open positions. Three lugs, abutments or stops 28 are radially spaced around inner surface 26 adjacent flanged inlet end 24, and form a planar end surface 30. Reduced end portion 22 defines a tubular, hollow section and an inwardly flanged outlet end 32 including flange 34 (FIGS. 3-4) which defines outlet 36. Portion 22 also includes wrench flats 37 on the exterior surface thereof.

An end cover or cap 38 is removably attached to inlet end 24. Cover 38 includes a planar outer flange 40 with inner surface 42 that sealingly engages planar end surface 30 of housing inlet end 24. Outer flange 40 also includes three attachment holes 44 that align with corresponding threaded holes 46 in abutments 28. Screws 48 extend through holes 44 and threadably into holes 46 to attach cover 38 to housing 12.

End cover 38 further includes a tubular centerpiece or hub portion 50 with an enlarged opening that defines inlet 52. Portion 50 (FIG. 4) extends both exteriorly and interiorly from annular flange 40 with respect to housing 12. The exterior part forms a hub 54 with external threads 56. The interior part forms a valve seat 58 with an inward seat surface 60 thereon.

Figure 3:
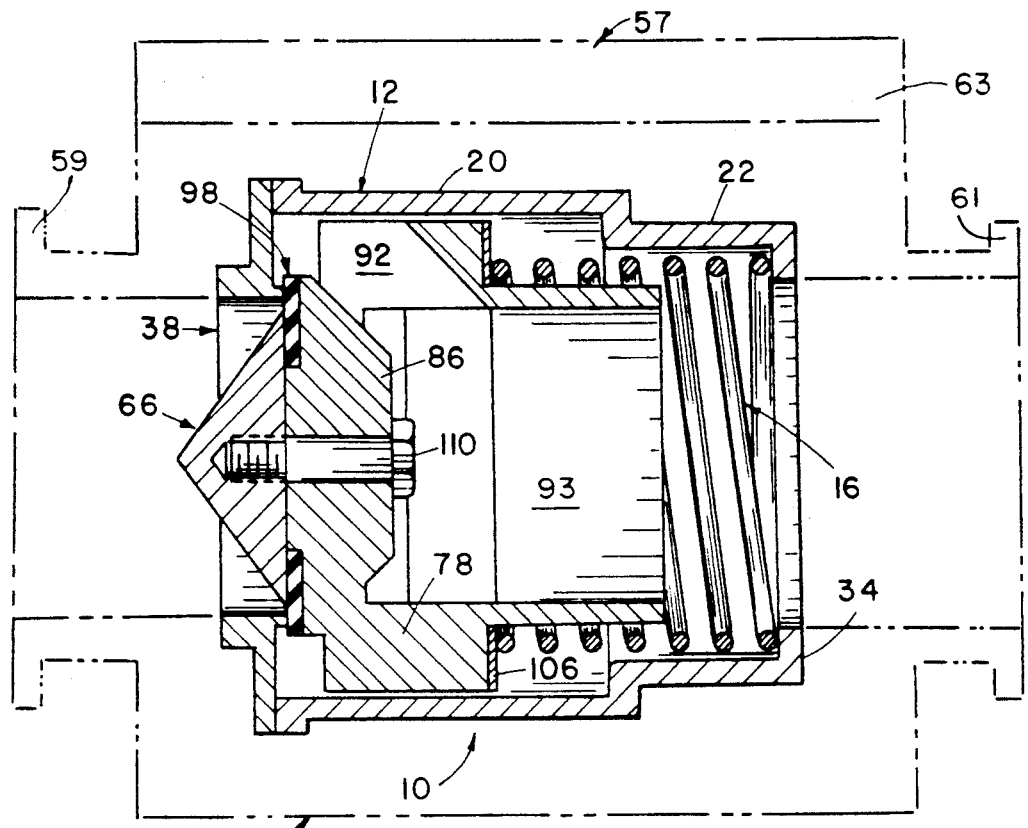
FIG. 3 is a side section of the valve in a closed position.

As seen in FIG. 3, assembly 10 is positioned within a main valve housing 57 which is connected to the piping system by flanged ends 59, 61. A removable cover 63 provides access to the interior of the main housing. End 59 defines an inlet, and end 61 defines an outlet. Hub 54 is threaded to housing 57 in line with the inlet. Valve housing 12 is engaged at flats 37 and rotated for installation and removal from the main housing.

Figure 4:
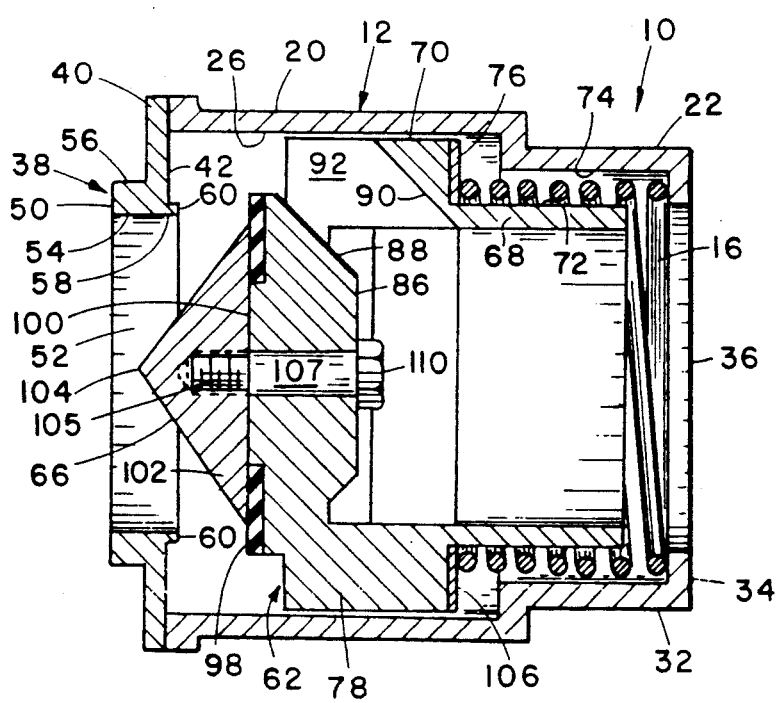
FIG. 4 is a side section of the valve in an open position.

Piston 14 (FIG. 1) includes a body 62 and a nose cone or deflector 66. Body 62 includes a tubular lower portion 67 with a lower cylindrical wall 68 connected to an enlarged and outwardly extending intermediate wall or flange 70. Portion 67 is positioned within spring 16. Lower cylindrical wall 68 includes an outer surface 72 on its outer diameter. Surface 72 is spaced from an inner surface 74 on housing portion 22 to capture spring 16 (FIGS. 3 and 4). Spring 16 has an end engaging flange 34 of outlet end 32 and an end engaging a washer 106 at the undersurface 76 of intermediate wall 70. Spring 16 is compressed by movement of piston 14 from seat 58. Piston 14 is resiliently biased toward inlet 52. Spring 16 is guided between surfaces 72 and 74 and substantially shielded from the main flow of water by intermediate wall 70 and lower cylindrical wall 68.

Intermediate wall 70 includes three or more standoffs or arms 78 that extend upwardly from intermediate wall 70. An outer surface 80 of each arm 78 (FIG. 1) and intermediated wall 70 join to form a smooth surface that slidingly engages inner surface 26 of housing enlarged portion 20 so as to guide piston 14 as it moves between closed and open positions. Piston 14 is also maintained in a centered and squared position in housing 12 by spring 16, which centers the lower tubular portion 67 of piston 14 in housing 12.

Intermediate wall 70 further includes three notches or apertures 82 (FIG. 1) radially spaced around its outer perimeter correspondingly to abutments 28. Apertures 82 are of sufficient size to allow piston 14 to slip into housing internal cavity 18 past abutments 28. When installed, piston 14 can be rotated to move lugs 28 out of alignment with notches 82. Flange 70 will then engage lugs 28 retaining piston 14 within valve body 12.

A centerpiece or seal support 86 is connected to the top of standoffs 78. Centerpiece 86 has a beveled surface 88 (FIG. 4) that extends substantially parallel to a beveled circular deflecting or impingement surface 90 on flange 70 and forms a passageway 92 therebetween divided into separate openings by arms 78. Passageway 92 communicates inlet 52 with the inside or internal bore 93 of piston tubular portion 67. As shown in FIG. 3, the diameter of bore 93 is the same or greater than the inner diameter of the system supply line. The total flow area through the piston is at least the same as the flow area of the supply line.

Centerpiece 86 (FIG. 1) has a front face 94 with an annular or washer-like area 96 therein for receiving a rubber seal 98. Area 96 includes a planar surface 100 for supporting seal 98 as piston 14 moves seal 98 forward into sealing engagement with seat 60 on housing 12 (FIG. 3). Seal 98 is a flat washer TM shaped member with a center opening 99 adapting it to fit over front face 94.

Deflector 66 attaches to the front face 94 of centerpiece 86. Deflector 66 defines a conical deflecting surface having a pointed tip 104 and an edge 102. Edge 102 overlaps an inner portion of seal 98. Seal 98 is sandwiched between deflector 66 and centerpiece 86. Deflector 66 includes a threaded hole 105 that aligns with an attachment hole 107 in centerpiece 86. A bolt 110 retains deflector 66 and seal 98 in place.

Washer 106 (FIG. 1) includes notches or apertures 108 around its perimeter. Apertures 108 are alignable with apertures 82 permitting the washer and the piston to slip past lugs 28.

The assembly of the components should now be apparent to one skilled in the art. Piston 14 is assembled with deflector 66 securely holding seal 98 on support surfaces 100 of piston body 62 by means of a bolt or other removable fastener 110. Spring 16 is inserted into internal cavity 18 of housing 12. Washer 106 and piston 14 are inserted past lugs 28 and rotated. Spring 16 is compressed, and piston 14 is retained within body 12 by lugs 28. Spring 16 can be compressed further, and end cover 38 is secured by screws 48 to the valve body. Spring 16 is preloaded. piston 14 forces seal 98 into sealing engagement with seat 60.

Valve assembly 10 is then placed within main housing 57. Hub 54 of cover 38 is threaded into the housing. Assembly 10 is easily serviced. A suitable wrench is used on housing 12 to remove the assembly from main housing 57. Cover 38 is removed. Piston 14 extends from housing 12 until it engages lugs 28. Bolt 110 can be removed permitting ready replacement of rubber seal 98. Cover 38 is then replaced and the entire assembly reinstalled in housing 57. The assembly provides significant service advantages over presently existing check valve assemblies.

In operation, piston 14 is held in a closed position (FIG. 3) with seal 98 sealingly engaging seat 60 by spring 16. When the differential pressure between inlet 24 and outlet 36 across valve 10 reaches the cracking pressure, piston 14 moves so that it unseats seal 98 from seat 60 allowing water to begin to flow (FIG. 4). The water is directed by deflector 66 and housing 12 so that it is directed through passageway 92 and impinges on surface 90. The fluid tends to open the valve so that the differential pressure within a flow rate range is less than the cracking pressure.

Figure 5:
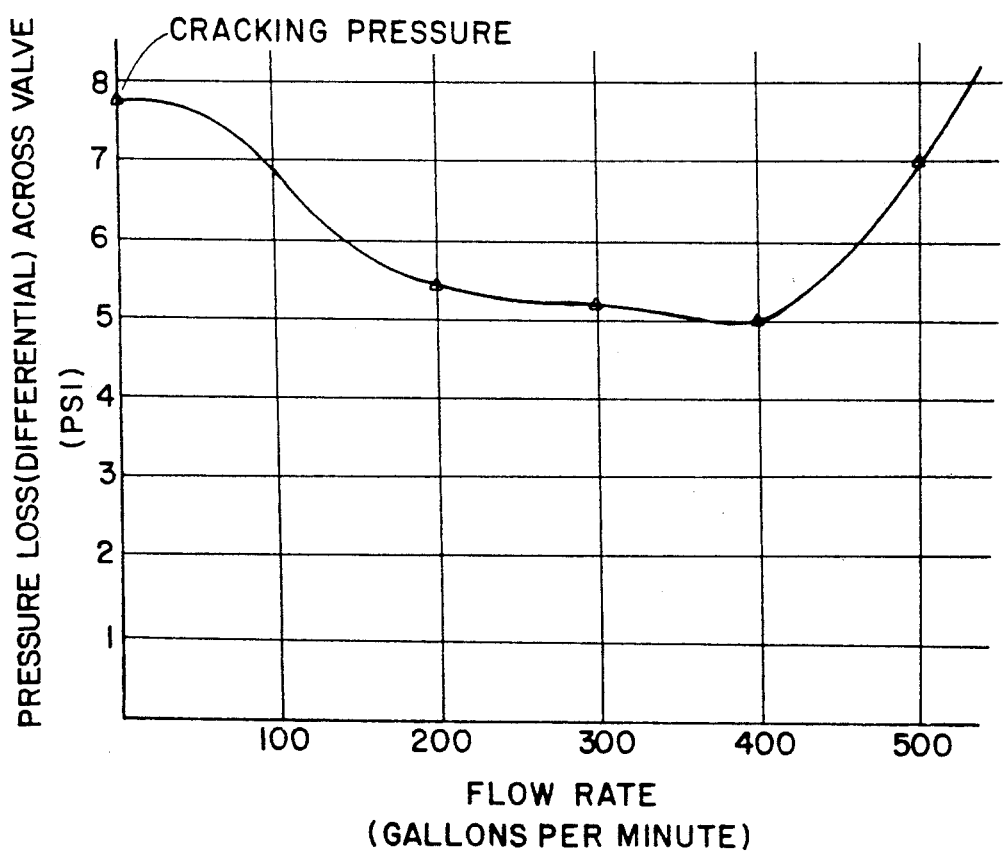
FIG. 5 is a graph illustrating the pressure profile at various flow rates for a given valve.

An example of the pressure profile of a valve 10 in accordance with the present invention is shown in FIG. 5. In FIG. 5, pressure loss or the differential pressure across the valve is given as a function of flow rate. The actual data points are noted by triangles on the graph. As can be seen, the initial cracking pressure or opening pressure is illustrated at the left of the graph at a zero flow rate and is about 7.8 psi. As flow rate increases, the differential across the valve drops to a low of about 5 psi at a flow rate of about 400 gpm. The pressure loss is below the cracking pressure for the valve for a range of flow rates from about 10 gpm to over 500 gpm.

The valve has a large flow area which reduces fouling. A smaller valve may be used to achieve desired flow rates due to the reduced pressure loss across the valve. The lower flow loss allows a lower supply pressure in a given system. A smaller booster pump or no pump at all may be specified.

In view of the foregoing, those of ordinary skill in the art may envision various modifications which would not depart from the inventive concepts disclosed. The above description should, therefore, be considered as only that of the preferred embodiment. The true spirit and scope of the present invention may be determined by reference to the appended claims.

The embodiments of the invention in which an exclusive property or privilege is claimed are defined as follows.

1. An in-line check valve for use in a fire protection system, said valve comprising:
   an elongated, tubular valve body defining a valve cavity, an inlet end and an outlet end, said valve body defining a plurality of lugs extending into said cavity adjacent said inlet end, said lugs dimensioned and positioned to retain said piston within said cavity;
   a valve seat removably secured to said valve body at said inlet end;
   a valve piston movably disposed within said valve cavity, said piston including a generally cylindrical body defining a through bore, a seal support, arms between the body and the seal support, a removable deflector and a seal sandwiched between said deflector and said seal support, said body further defining an angled, annular impingement surface, said seal support, said arms and said impingement surface defining openings communicating with said bore; and
   a spring within said cavity and engaging said piston for resiliently biasing said piston toward said seat.

2. An in-line check valve for use in a fire protection system, said valve comprising:
   an elongated, tubular valve body defining a valve cavity, an inlet end and an outlet end;
   a valve seat removably secured to said valve body at said inlet end;
   a valve piston movably disposed within said valve cavity, said piston including a generally cylindrical body defining a through bore, a seal support, arms between the body and the seal support, a removable deflector and a seal sandwiched between said deflector and said seal support, said body further defining an angled, annular impingement surface, said seal support, said arms and said impingement surface defining openings communicating with said bore; and
   a spring within said cavity and engaging said piston for resiliently biasing said piston toward said seat, said valve body defines a plurality of lugs extending into said cavity adjacent said inlet end, and said piston body defines a plurality of apertures alignable with said lugs and dimensioned so that said piston may be inserted into said cavity and rotated whereby the piston body engages said lugs and the piston is retained within said cavity.

3. An in-line check valve as defined by claim 2 wherein said valve seat includes an annular flange and a generally cylindrical hub, said hub defining an outer threaded surface.

4. An in-line check valve as defined by claim 3 wherein said valve body has a stepped configuration in cross section.

5. An in-line check valve as defined by claim 4 wherein said spring is a coil spring compressed between the outlet end of said valve body and said piston body.

6. A check valve comprising:
   a valve housing defining an internal cavity, an inlet to said cavity including a seat, and an outlet;
   a piston positioned in said cavity and movable between a closed position and an open position;
   a removable seal adapted to engage said seat;
   said piston including retaining means for holding said seal and a support having a support surface located on the inlet end of said piston for supporting said seal so that said seal is pressed against said seat when said piston is in said closed position, said support including a beveled surface;
   spring means for resiliently biasing said piston toward said closed position, said spring means being preloaded so that a given cracking pressure is required to open said valve; and
   wherein said piston includes an impingement surface impinged on by fluid flowing through said valve so that fluid flowing through said valve moves the piston toward an open position, said impingement surface being generally circular, inwardly beveled and extending in spaced, substantially parallel relationship to said beveled surface of said support, and wherein the differential pressure across said valve within a given flow range is less than the initial cracking differential pressure.

7. An apparatus as set forth in claim 6 wherein said retaining means includes a deflector that holds said seal on said piston and which defines an angled surface that deflects the fluid entering said inlet across said seal and into contact with said impingement surface.

8. An apparatus as set forth in claim 7 wherein said seal is made of a resilient rubber material.

9. An apparatus as set forth in claim 6 wherein said piston includes a tubular portion with an outer surface that guides said spring means between said open and closed positions, and also includes an inner surface that directs fluid past said spring means so that disruption to the fluid flow is reduced and resistance to fluid flow is minimized.

10. An apparatus as set forth in claim 9 wherein said valve housing includes ends adapting said valve housing to fit laterally into a valve assembly and into alignment with a high volume fluid line.

11. An apparatus as set forth in claim 10 wherein one of said ends includes external threads adapted to threadably engage an in-line mounting structure to hold said in-line check valve in place.

12. An apparatus as set forth in claim 6 wherein said valve housing includes a removable end cover, said end cover including said seat and being removable permitting said piston to be removed from said cavity.

13. An apparatus as set forth in claim 2 including a means for retaining said piston within said cavity upon removal of said end cover.

14. A check valve comprising:
   a valve housing defining an internal cavity, an inlet to said cavity including a seat and an outlet;
   a piston positioned in said cavity and movable between a closed position and an open position;
   a removable seal adapted to engage said seat;
   said piston including retaining means for holding said seal and a support surface located on the inlet end of said piston for supporting said seal so that said seal is pressed against said seat when said piston is in said closed position;
   spring means for resiliently biasing said piston toward said closed position, said spring means being preloaded so that a given cracking pressure is required to open said valve;

wherein said piston includes a deflecting surface impinged on by fluid flowing through said valve so that fluid flowing through said valve moves the piston toward an open position and wherein the differential pressure across said valve within a given flow range is less than the initial cracking differential pressure, said valve housing including a removable end cover, said end cover including said seat and being removable permitting said piston to be removed from said cavity; and means for retaining said piston within said cavity upon removal of said end cover, said means for retaining said piston including abutments in said internal cavity of said housing, and said piston defines a plurality of apertures positioned to allow said piston to be inserted into said internal cavity and against said spring means with said abutments slipping through said apertures.

* * * * *

UNITED STATES PATENT AND TRADEMARK OFFICE
CERTIFICATE OF CORRECTION

PATENT NO. : 5,174,327
DATED : December 29, 1992
INVENTOR(S) : Truax et al.

It is certified that error appears in the above-indentified patent and that said Letters Patent is hereby corrected as shown below:

Column 1, line 47; "a outlet" should be --an outlet--.
Column 4, line 1; "washer TM shaped" to read --washer-shaped--.
Column 6, line 52, claim 13; "claim 2" should be --claim 12--.

Signed and Sealed this

Nineteenth Day of April, 1994

BRUCE LEHMAN

Attest:

Attesting Officer

Commissioner of Patents and Trademarks